(12) United States Patent
Bai

(10) Patent No.: US 10,257,010 B2
(45) Date of Patent: Apr. 9, 2019

(54) ELECTRONIC DEVICE AND METHOD FOR SYNCHRONOUS DETECTION BETWEEN TIME DIVISION DUPLEX WIRELESS COMMUNICATION CELLS

(71) Applicant: SONY CORPORATION, Tokyo (JP)

(72) Inventor: Wei Bai, Beijing (CN)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 15/312,707

(22) PCT Filed: May 27, 2015

(86) PCT No.: PCT/CN2015/079895
§ 371 (c)(1),
(2) Date: Nov. 21, 2016

(87) PCT Pub. No.: WO2015/180640
PCT Pub. Date: Dec. 3, 2015

(65) Prior Publication Data
US 2017/0187511 A1    Jun. 29, 2017

(30) Foreign Application Priority Data

May 29, 2014  (CN) .......................... 2014 1 0234233

(51) Int. Cl.
*H04L 27/26* (2006.01)
*H04W 24/00* (2009.01)
(Continued)

(52) U.S. Cl.
CPC ............ *H04L 27/2655* (2013.01); *H04L 5/14* (2013.01); *H04W 24/00* (2013.01); *H04W 56/00* (2013.01);
(Continued)

(58) Field of Classification Search
CPC .............. H04B 7/2684; H04L 27/2613; H04L 27/2655; H04L 27/2656; H04L 27/2662; H04L 27/2675
See application file for complete search history.

(56) References Cited

U.S. PATENT DOCUMENTS

| 8,804,660 B2 * | 8/2014 | Liao | .................. | H04W 36/0055 |
| | | | | 370/331 |
| 2009/0067370 A1 * | 3/2009 | Kim | ..................... | H04B 1/7083 |
| | | | | 370/328 |

(Continued)

FOREIGN PATENT DOCUMENTS

| CN | 1960211 A | 5/2007 |
| CN | 102130712 A | 7/2011 |

(Continued)

OTHER PUBLICATIONS

International Search Report dated Aug. 28, 2015 in PCT/CN2015/079895 filed May 27, 2015.

*Primary Examiner* — Raj Jain
(74) *Attorney, Agent, or Firm* — Xsensus LLP

(57) ABSTRACT

An electronic device and method for synchronous detection between time division duplex wireless communication cells. The electronic device can access a communication channel of a time division duplex wireless communication system, and includes: an acquisition unit configured to acquire an actual time slot proportion of a target cell and a cell ID and an operator ID of the target cell at a specific moment; and a reporting unit configured to transmit the actual time slot proportion of the target cell and the cell ID and the operator ID thereof to a designee. By this technology, networks of different operators can be detected effectively, and by a comparison with a reference time or a coordinated uplink/downlink time slot proportion, a meaningful comparison result is obtained. Moreover, the measurement or compari- (Continued)

son result is provided for a third party, such as a network manager, to confirm, so that the result is more credible.

18 Claims, 6 Drawing Sheets

(51) Int. Cl.
    *H04W 56/00*    (2009.01)
    *H04L 5/14*    (2006.01)
    *H04W 72/04*    (2009.01)

(52) U.S. Cl.
    CPC ..... *H04W 56/0015* (2013.01); *H04W 72/042* (2013.01); *H04W 72/0446* (2013.01)

(56) References Cited

U.S. PATENT DOCUMENTS

2010/0232397 A1* 9/2010 Hu .................. H04B 1/70735
                                                                          370/336
2017/0187511 A1* 6/2017 Bai ................... H04W 24/00

FOREIGN PATENT DOCUMENTS

| CN | 102264076 A | 11/2011 |
| CN | 102315877 A | 1/2012 |
| CN | 102905372 A | 1/2013 |
| CN | 103687013 A | 3/2014 |

\* cited by examiner

ELECTRONIC DEVICE AND METHOD FOR SYNCHRONOUS DETECTION BETWEEN TIME DIVISION DUPLEX WIRELESS COMMUNICATION CELLS

FIELD

The present disclosure relates to the field of wireless communications, and in particular to an electronic device and a method for performing synchronization detection between cells in a time division duplex wireless communication system.

BACKGROUND

With a large-scale development of TDD-LTE (time division duplex long-term evolution) commercial network, in some countries or regions, there will be cases where multiple operators deploy TDD-LTE networks in a same geographical area, and it can be foreseen that such cases will become more prevalent. Currently, there are cases that multiple operators operate the TDD-LTE network at adjacent channels in the frequency bands of both 2.6 GHz and 2.3 GHz in China, and no guard band is reserved between frequency bands owned by the operators.

In a case that multiple operators deploy TDD networks in adjacent frequency bands in a same geographical area, severe interference will be caused if synchronization and coordination of uplink/downlink time slot allocation are not performed between the operators. For example, if a base station (a terminal) of an operator is in a transmit mode, and a base station (a terminal) of another operator is in a receive mode at a same time instant, a receiver may have a ground noise rising or even be blocked due to out-of-band radiation characteristics of a transmitter and undesirable adjacent channel selectivity of the receiver, thereby affecting the reception of useful signal by the receiver. In this case, it is necessary to provide a guard band and/or an additional radio frequency filter and/or other interference cancellation to reduce the interference.

In addition to providing the guard band and the additional filter to avoid the interference, another method is to negotiate by the multiple operators for synchronous operation between the TDD systems. That is, base stations of the TDD systems of multiple operators are all in a transmit state or a receive state in a same time instant.

Considering in view of spectrum utilization and an extra renovation cost of a device, synchronization between TDD systems is the most effective scheme of deploying the TDD systems in a same geographical area in adjacent frequency bands by multiple operators. Hence, an operable and effective solution of synchronization between multiple operators is crucial for ensuring a stable and reliable operation of TD-LTE systems.

Regarding the synchronization between TDD systems of multiple operators, various operators have a common point that, it is desirable to have a reliable and credible scheme for finding and proving a base station or a cell which is out of step. It is proposed to find and prove the out-of-step base station with a scheme of detecting an interference source on the base-station side and analyzing an interference model. However, the scheme can only prove that there is no perfect synchronization between base stations, but has great difficulties in proving which base station is out of step. Currently, the operators and manufacturers generally believe that a test made by a third party have a higher credibility.

SUMMARY

An aspect of the present disclosure relates to an electronic device capable of accessing a communication channel of a time division duplex wireless communication system. The electronic device includes: an acquiring unit configured to acquire, at a specific time, an actual time slot allocation of a target cell, as well as a cell ID (identifier) and an operator ID of the target cell; and a reporting unit configured to transmit the actual time slot allocation of the target cell as well as the cell ID and the operator ID of the target cell to a designated party.

Another aspect of the present disclosure relates to an electronic device for a time division duplex wireless communication system. The electronic device includes: a command unit configured to notify a specific terminal device of a target cell serving as a target of synchronization detection, as well as a detection period or a maximum detection time interval for the synchronization detection; and a receiving unit configured to receive an actual time slot allocation of the target cell as well as a cell ID and an operator ID of the target cell reported by the specific terminal device.

Another aspect of the present disclosure relates to a method of detecting synchronization between cells in a time division duplex wireless communication system. The method includes: acquiring, at a specific time, an actual time slot allocation of a target cell, as well as a cell ID and an operator ID of the target cell; and transmitting the actual time slot allocation of the target cell as well as the cell ID and the operator ID of the target ID to a designated party.

Another aspect of the present disclosure relates to a method of detecting synchronization between cells in a time division duplex wireless communication system. The method includes: notifying a specific terminal device of a target cell serving as a target of synchronization detection, as well as a detection period or a maximum detection time interval of the synchronization detection; and receiving an actual allocation of the target cell as well as a cell ID and an operator ID of the target cell reported by the specific terminal device.

With the synchronization detection scheme according to the present disclosure, networks of different operators can be detected effectively by performing the measurement on the terminal side, and a meaningful comparison result can be obtained by performing a comparison with a reference time or a coordinated uplink/downlink time slot allocation. Moreover, the scheme according to the present disclosure can be implemented with existing hardware capability of a user without requiring special upgrade of hardware, and therefore has industrial practical applicability.

BRIEF DESCRIPTION OF THE DRAWINGS

By referring to the following description of embodiments of the present disclosure in conjunction with the drawings, the above and other objects, features and advantages of the present disclosure will be more easily understood. In the drawings, a same or corresponding technical feature or component is represented by a same or corresponding reference numeral.

DETAILED DESCRIPTION OF EMBODIMENTS

Figure 1:
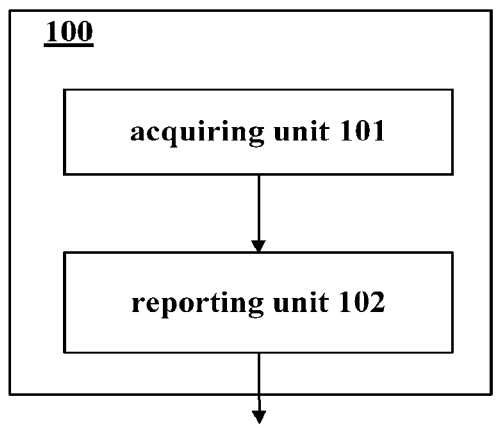
FIG. 1 is a block diagram showing a functional structure of a terminal detection device according to an embodiment of the present disclosure.

For TDD synchronization between operators, it is required that uplink transmission and downlink transmission do not coexist between any two cells of different operators in a same geographical area. It means that both of the following two conditions must be met: 1. TDD frame start times are synchronous; 2. TDD uplink/downlink time slot allocations are synchronous. In other words, it can be determined that TDD wireless communication is out of step between various operators if it is detected that any one of the above two conditions is not met.

In the synchronization detection scheme according to embodiments of the present disclosure, a frame start time and/or uplink/downlink time slot allocation of a target cell serving as a target of synchronization detection are measured by an electronic device on a terminal side, and the measured frame start time and/or uplink/downlink time slot allocation are provided to a designed party (for example, a base station of an operator or a network administrator serving as a third party), so as to detect the occurrence of out-of-step in the TDD wireless communication system.

The uplink/downlink time slot allocation indicates a transmission direction (uplink/downlink) of each sub-frame in a TDD frame (a radio frame, radio frame).

In the TDD-LTE wireless communication system, each radio frame is constituted by two half-frames each having a length of 5 ms. Each of the half-frames includes 8 regular time slots each having a length of 0.5 ms, and three special time slots, i.e., a DwPTS (a downlink pilot time slot), a GP (a main guard time slot) and an UpPTS (an uplink pilot time slot). Lengths of the DwPTS and the UpPTS are configurable.

Uplink/downlink sub-frame allocations in TDD-LTE are shown in Table 1. "D" represents that the sub-frame is used for downlink transmission, "U" represents that the sub-frame is used for uplink transmission, and "S" is a special sub-frame constituted by the DwPTS, GP and UpPTS.

TABLE 1

| Uplink/downlink allocation | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For example, in a case that the time slot allocations of line 1 and line 2 in Table 1 coexist, severe interference would occur in data transmission between the cells since uplink/downlink configurations are inconsistent at time slot 3 and time slot 8.

To access communication channels (communication band) of cells of different operators, it is required that an electronic device for measurement on the terminal side (hereinafter abbreviated as a "terminal device" or "terminal detection device") has an antenna module for scanning, receiving and transmitting on a concerned wireless frequency band. In addition, it is required that the terminal device can receive a time signal for reference, for example, a GPS clock signal or a clock signal provided by a network administrator. In addition, a dedicated synchronization detection device may also be provided when the network is deployed. For example, the dedicated synchronization detection device is dedicated to perform synchronization detection according to the present disclosure, i.e., only receive and transmit a signal related to the synchronization detection.

FIG. 1 is a block diagram showing a functional structure of a terminal detection device 100 according to an embodiment of the present disclosure. The terminal detection device 100 includes an acquiring unit 101 and a reporting unit 102. The acquiring unit 101 is configured to acquire, at a specific time, an actual time slot allocation of a target cell, as well as a cell ID and an operator ID of the target cell. For example, the acquiring unit 101 may acquire the actual uplink/downlink time slot allocation of the target cell as well as the cell ID and the operator ID of the target cell by monitoring system information of the target cell. For example, a "system information block type 1" (SystemInformationBlockType1) message sent by the target cell is monitored, a TDD-config (TDD-configuration) information element (IE) included in the massage is obtained, and the uplink time slot allocation of the target cell is determined. In addition, for example, the operator ID may be determined based on PLMN-Identity (public land mobile network-identity) contained in the system information.

In a case that the synchronization detection of TDD systems is performed by a dedicated detection device, the dedicated detection device may select a measurement timing adaptively based on a maximum detection time interval which is preset in advance or configured on the network side. The measurement timing is the timing (an instance of the "specific timing") at which the acquiring unit 101 acquires the actual time slot allocation of the target cell. Here, the "maximum detection time interval" refers to a maximum time interval between two successive measurements made on a same cell. The acquiring unit 101 may either obtains the actual time slot allocation periodically with a fixed cycle length less than the maximum detection time interval, or adjust the time interval of the obtaining operation dynamically based on a change in channel quality of the communication network as long as the time interval is less than the maximum time interval.

A target measurement cell of the dedicated synchronization detection device may be designated on the network side by using signaling. The signaling for designating the target cell may be received by the acquiring unit 101.

In a case that the terminal detection device is implemented by a regular user equipment such as a cell phone, the acquiring unit 101 (for example, an antenna module of the cell phone) may receive, in addition to the designation of the target measurement cell from the network side, a specific synchronization interval configured on the network side. The synchronization detection device stops regular communication operation during the configured specific synchronization interval, and monitors the target cell to perform the synchronization detection operation. In addition, during the specific synchronization interval, a serving base station of the terminal also stops regular communication with the terminal to prevent from loss of any regular communication information during the time when the terminal serves as the synchronization detection device.

In a case that the terminal detection device is implemented with the regular user equipment, configuration may be performed on the network side according to actual demands to activate a synchronization detection function of the terminal device to start the synchronization detection operation. For example, a terminal device in a cell may be configured by the network side when strong interference in the cell is detected, to activate the synchronization detection operation. Apparently, the terminal may also be configured in advance when the terminal enters the cell, and then the synchronization detection operation is activated when strong interference occurs.

The reporting unit 102 of the terminal device 100 is configured to transmit the actual time slot allocation of the target cell as well as the cell ID and the operator ID of the target cell to a designated party such as a serving base station of the terminal device or a network administrator approved by the operator.

In a different embodiment, the reporting unit 102 may be configured to transmit the actual time slot allocation of all the target cells as well as the cell IDs and the operator IDs of the target cells obtained by the acquiring unit 101 to the designated party, or may be configured to report only the actual time slot allocation of the target cell proved to be out of step as well as the cell ID and the operator ID of the target cell to the designated party. In addition, in a different embodiment, the reporting unit 102 may have different timing to report to the designated party. For example, the reporting unit 102 may be configured to report no matter whether out-of-step is detected or not, or may be configured to report only when out-of-step is detected. For example, the reporting unit 102 may be configured to report the actual time slot allocation as well as cell IDs and operator IDs of all the target cells only when out-of-step is detected. Detailed descriptions will be given in following embodiments.

In a case that the terminal detection device 100 is the dedicated synchronization detection device, the reporting device 102 can report to the designated party by using RRC connection request signaling of a radio resource control (RRC) connection request initiated by the terminal detection device 100.

In a case that the terminal detection device 100 is a regular user equipment such as a cell phone, the reporting unit 102 not only can report to the designated party by using the RRC connection request signaling, but also can report by using other RRC signaling, including but not limited to an RRC measurement result report or a UE variable report.

In an embodiment, the terminal detection device 100 acquires the actual time slot allocation of the target cell, then directly provides the acquired actual time slot allocation to the designated party along with identification information on the corresponding target cell. The designated party compares the actual time slot allocation with a predetermined target time slot allocation to determine whether an out-of-step occurs.

Figure 2:
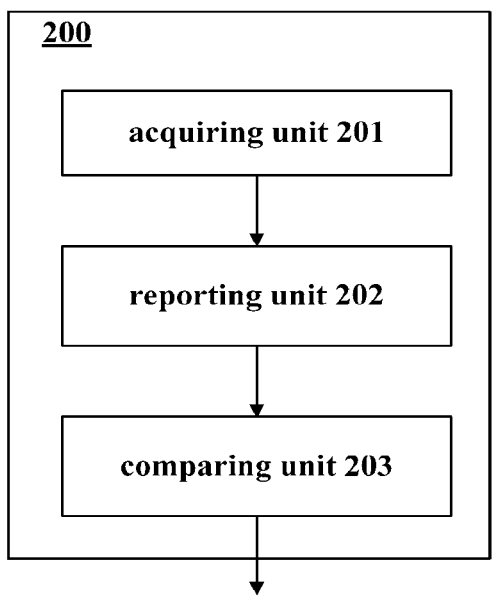
FIG. 2 is a block diagram exemplifying a functional structure of a terminal detection device according to another embodiment of the present disclosure.

In another embodiment, the determination of whether an out-of-step occurs may also be made on the terminal side, and then the determination result is transmitted to the designated party. FIG. 2 is a block diagram exemplifying a functional structure of a terminal detection device 200 according to another embodiment of the present disclosure. The synchronization detection device 200 includes an acquiring unit 201, a reporting unit 202 and a comparing unit 203.

In addition to acquiring, at a specific time (for example, a time instant when reaching a detection timing or a time instant when synchronization detection function is activated), the actual time slot allocation of the target cell as well as the cell ID and the operator ID of the corresponding target cell, the acquiring unit 201 is further configured to acquire a target time slot allocation of the target cell. The target time slot allocation may be acquired at any time. For example, for a dedicated synchronization detection device, a target cell to be detected and a target time slot allocation of the target cell may be set when the network is deployed. Alternatively, the target time slot allocation of the network may be readjusted with changes in parameters such as network throughput, network quality, and the readjusted target time slot allocation is notified to the dedicated synchronization detection device. For a regular user equipment such as a cell phone, a target cell to be detected and a target time slot allocation of the target cell may be configured when the user equipment enters the network or a distance from a serving base station of the user equipment to the user equipment is reduced to a predetermined value. Optionally, the user equipment may be configured and activated when strong interference occurs and the user equipment is to be used for synchronization detection. In other words, the acquiring unit 201 of the synchronization detection device 200 may obtain the target time slot allocation of the target cell in different scenarios depending on different designs. In an example, the regular user equipment takes a time slot allocation operated in a serving cell of the user equipment as the target time slot allocation of the target cell, without acquiring the target time slot allocation of the target cell specially.

The comparing unit 203 may be configured to compare the actual time slot allocation of the target cell with the target time slot allocation. Inconsistency of time slot allocation may be, for example, as shown in the above Table 1, where the actual time slot allocation and the target time slot allocation have inconsistent uplink/downlink transmission directions at a certain corresponding time slot. In a case that a target time slot allocation is configured to be a time slot allocation set in a network, for example, the inconsistency of time slot allocation refers to that the actual time slot allocation does not belong to the time slot allocation set. A candidate time slot allocation set of a network may be configured as the target time slot allocation in a case that the network employs a dynamic TDD uplink/downlink time slot allocation which changes among predetermined several time slot allocations.

The reporting unit 202 may be configured to transmit at least the actual time slot allocation inconsistent with the target time slot allocation as well as the cell ID and the operator ID of the corresponding target cell to the designated party, thereby the designated party can notify an out-of-step cell of the occurrence of out-of-step based on the received detection result, so that the out-of-step cell can adjust its time slot allocation of uplink/downlink. As described above, the reporting unit 202 may report by using RRC connection request signaling. A regular user terminal such as a cell phone may further report by using a RRC signaling other than the RRC connection request signaling.

In the above embodiment, synchronization detection is performed only with respect to the uplink/downlink time slot allocation. Since out-of-step of cell may also be caused by inconsistency of start time of radio frames between cells of different operators, in another embodiment, start time of a radio frame may also be detected.

For example, no matter in an embodiment where the terminal detection device only acquires and forwards the time slot allocation, or in an embodiment where the terminal detection device compares the actual time slot allocation with the target time slot allocation, the terminal detection device may detect the start time of radio frame additionally.

In addition, similar to processing on the uplink/downlink time slot allocation, the terminal detection device may detect and forward the actual start time of radio frame of a cell to a designated party, or may obtain and compare the actual start time of radio frame with a reference (desired) start time of radio frame, and report to the designated party based on the comparison result.

Next, the terminal detection device 200 as shown in FIG. 2 is described as an example. The acquiring unit 201 may be configured to acquire an actual frame start time of a target cell at a specific time same as that of obtaining the actual time slot allocation. For example, the acquiring unit 201 may acquire the actual frame start time by monitoring a downlink synchronization signal of the target cell. In addition, the acquiring unit 201 may further acquire, from a reference time source on the network side, a reference time as a time reference.

The comparing unit 203 may further be configured to calculate a difference between the actual frame start time of the target cell and a desired frame start time based on the reference time.

The reporting unit 202 may be configured to transmit at least the difference having an absolute value greater than a predetermined threshold, as well as the cell ID and the operator ID of the corresponding target cell, to the designated party, so as to notify the designated party to take corresponding actions. Optionally, the reporting unit 202 may also be configured to transmit all the differences calculated by the comparing unit 203 and identification information on the corresponding cell to the designated party so as to perform further synchronization determination by the designated party. If the absolute value of the calculated difference is greater than the predetermined threshold, it is considered that out-of-step of a cell is detected in a communication system, and the out-of-step cell may be found based on the identification information corresponding to the difference. The predetermined threshold for the absolute value of the difference may be set based on specific conditions. For example but not limited to, based on a synchronization indicator between base stations which is required by the 3GPP, the threshold may be set to be 3 microseconds in a case that the cell has a small radius (for example, a radius less than 3 km); or the threshold may be set to be 10 microseconds in a case that the cell has a large radius (for example, a radius greater than 3 km).

In addition and optionally, the comparison between the actual frame start time and the reference frame start time may not be performed in the terminal detection device. Instead, the reporting unit directly forwards the actual frame start time and the identification information acquired by the acquiring unit to the designated party. The designated party performs further comparison and determination.

Figure 3:
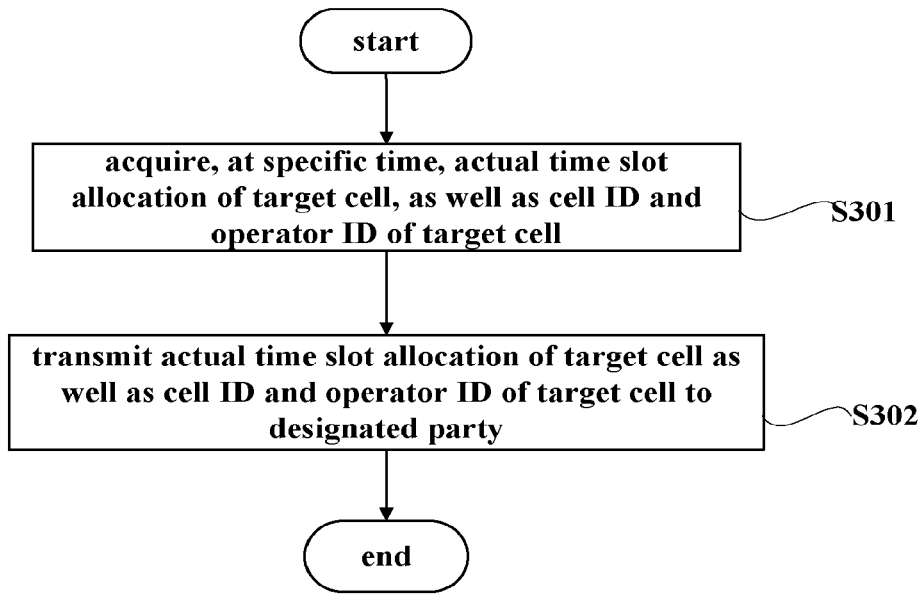
FIG. 3 is a flowchart exemplifying a method for detecting synchronization between TDD cells performed by a terminal detection device according to an embodiment of the present disclosure.

FIG. 3 is a flowchart exemplifying a method for detecting synchronization between cells performed by a terminal detection device according to an embodiment of the present disclosure. In step S301, an actual time slot allocation of a target cell as well as a cell ID and an operator ID of the target cell are acquired at a specific time. As described above with reference to FIG. 1 and FIG. 2, for a dedicated terminal detection terminal, the specific time is the detection timing set based on a pre-configured maximum time interval between two tests on a same cell, for example; for a regular user equipment having a synchronization detection function, the specific time is a synchronization detection period and a synchronization detection interval (time for monitoring the target cell) configured on the network side, for example.

Configuration information such as a synchronization detection interval, designation information on a target cell, identification information such as a cell ID and an operator ID, and configuration parameter reported by a synchronization measurement result such as a reporting criterion and a reporting format, may all be received by the terminal detection device by receiving a dedicated signaling, e.g., a "radio resource control connection reconfiguration" message (RRCConnectionReconfiguration), transmitted from the serving cell. The synchronization detection device may obtain, for example, a "system information block type 1" (SystemInformationBlockType1) from system information broadcasted on a broadcast control channel (BCCH), and read TDD-config IE (TDD configuration element) from the "system information block type 1". By analyzing sub-frame allocation information (sub-frameAssignment) in the TDD-config IE, the actual time slot allocation of the target cell may be obtained based on which one of sa0, sa1, sa2, sa3, sa4, sa5 and sa6 the value of the sub-frameAssignment is (wherein sa0 indicates allocation 0, sa1 indicates allocation 1, and so on).

In step S302, the actual time slot allocation as well as the cell ID and the operator ID of the target cell are transmitted to the designated party. That is, the terminal detection device reports a measurement result after performing a synchronization measurement. The measurement result may include actual measurement results of all the target cells or the out-of-step cells as well as the cell IDs and the operator IDs of the corresponding target cells. Based on the reporting configuration, the measurement result may further include other information related to the synchronization measurement.

Figure 4:
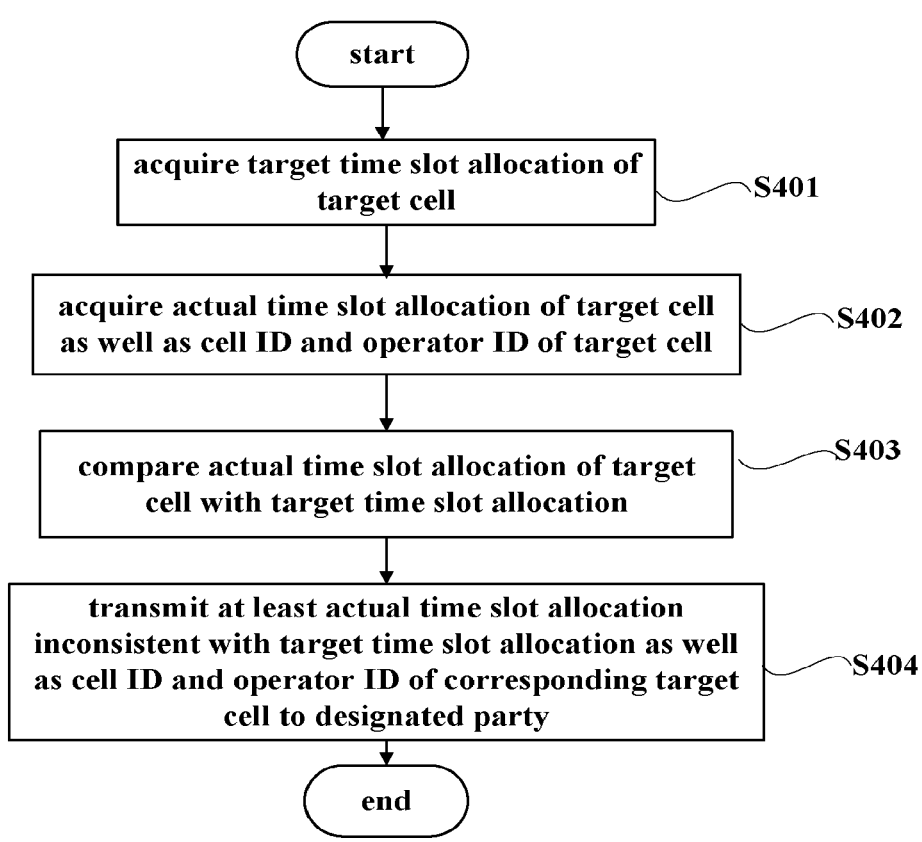
FIG. 4 is a flowchart exemplifying a method for detecting synchronization between TDD cells performed by a terminal detection device according to an embodiment of the present disclosure.

FIG. 4 is a flowchart exemplifying a method for detecting synchronization between TDD cells performed by a terminal detection device according to an embodiment of the present disclosure. In step S401, a target time slot allocation of the target cell is acquired. For example, a dedicated synchronization detection device may acquire the target time slot allocation of the target cell configured by the network side during network initialization. For example, a regular user equipment such as a cell phone may acquire, along with the designation of the target cell, the target time slot allocation of the target cell configured by the network side when entering the cell or when strong interference occurs in the communication network.

In step S402, at a specific time such as a synchronization detection interval, for example, the actual time slot allocation of the target cell as well as the cell ID and the operator ID of the corresponding target cell are acquired by monitoring system information on the network side.

In step S403, the actual time slot allocation of the target cell is compared with the target time slot allocation. For example, the number of the actual time slot allocation may be learned from the above-described TDD-config IE, and compared with the number of the target time slot allocation.

In step S404, at least the actual time slot allocation inconsistent with the target time slot allocation as well as the cell ID and the operator ID of the corresponding target cell are transmitted (reported) to the designated party. A detection result may be transmitted by using RRC connection request signaling. For the regular user equipment, the detection result may also be transmitted by using other RRC signaling. In addition, the detection result may be transmitted to the designated party once a round of detection is finished, or may be transmitted to the designated party only in a case that out-of-step is detected.

Details of specific operations have been described with reference to FIG. 1 and FIG. 2, and hence operations in each step will not be described in detail here.

Although flowcharts of FIG. 3 and FIG. 4 only exemplify a method for detecting and verifying synchronization between cells based on a time slot allocation, it can be understood that an embodiment that detection is performed only based on an a frame start time and an embodiment that detection and verification are performed based on both the time slot allocation and the frame start time are similar to the method. A detailed description is omitted here since the embodiments have been described with reference to FIG. 1 and FIG. 2.

Figure 5:
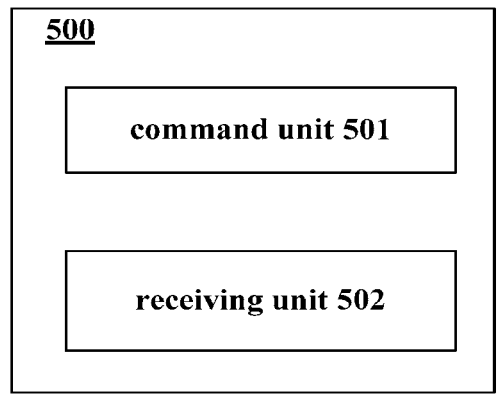
FIG. 5 is a block diagram exemplifying a functional structure of an electronic device for performing synchronization detection on a network side according to an embodiment of the present disclosure.

FIG. 5 is a block diagram exemplifying a functional structure of an electronic device 500 for performing synchronization detection on a network side according to an embodiment of the present disclosure. A synchronization detection device on the network side and a synchronization detection device on the terminal side may be used together for performing complete synchronization detection. The synchronization detection device 500 includes a command unit 501 and a receiving unit 502.

The command unit 501 is configured to notify a terminal side detection device of a target cell serving as a target of synchronization detection. For example, information for designating the target cell includes a cell ID of the target cell, an operator ID and an operation band of the cell. In addition, the command unit 501 is configured to notify the terminal side detection device of a desired detection period and a synchronization detection interval for performing synchronization detection by the terminal side detection device, or of a maximum detection time interval between two synchronization detections. For the terminal side detection device such as a cell phone, the synchronization detection interval means that: during the interval, the terminal detection device stops normal communication and monitors the target cell on which the synchronization detection is to be performed. A serving base station of the terminal detection device stops transmitting regular communication data to the terminal detection device during the synchronization detection interval so as to prevent losing data.

The command unit 501 may configure the terminal detection device by using, for example, dedicated signaling in a case that the synchronization detection device 500 is implemented as a base station. For example, the dedicated signaling is an RRC connection reconfiguration (ConnectionReconfiguration) message. The ConnectionReconfiguration message may include synchronization measurement configuration information such as a synchronization measurement configuration information element (sync measurement config information element). Specifically, the synchronization measurement configuration information may include a target measurement object (sync measurement objects) for indicating a synchronization measurement target cell. Optionally, the synchronization measurement configuration information may include a synchronization measurement ID (sync measurement identities) for associating the synchronization measurement object with the reported synchronization measurement result, a synchronization measurement interval and a configuration parameter (for example, a reporting criteria and a reporting format) relating to reporting of the synchronization measurement result and the like.

The receiving unit 502 is configured to receive an actual time slot allocation of the target cell as well as a cell ID and an operator ID of the target cell reported by the terminal detection device. As explained above in introducing the terminal detection device, the actual allocation and the identification information on the corresponding cell may be reported by the terminal detection device by using RRC connection signaling or other RRC signaling. Hence, the receiving unit 502 may receive by detecting the RRC connection request signaling or other RRC request signaling (for example, measurement result signaling). The received actual allocation and other information may be information on all the synchronization detection target cells in the geographical area, or may be information on an out-of-step target cell only.

The command unit 501 may further notify the terminal detection device of a target time slot allocation of the target cell in a case that the determination of whether an out-of-step occurs is made on the terminal side, for example, the terminal detection device compares the actual time slot allocation with the target time slot allocation. The command unit 501 may make the notification at different timing in different scenarios. For example, a regular user equipment such as a cell phone may be configured when the user equipment enters a serving cell by, for example, being notified of a synchronization detection target cell and a target time slot allocation; or may be configured while the terminal detection device is activated for detection when channel quality of the communication network becomes poor such that interference exceeds a certain threshold.

In a case that a start time of radio frame is considered in synchronization detection, that is, the synchronization detection device on the terminal side also measures an actual frame start time of the target cell, the receiving unit 502 of the synchronization detection device 500 may further be configured to receive the actual frame start time of the target cell as well as the cell ID and the operator ID of the corresponding target cell reported by the synchronization detection device on the terminal side.

In addition, in a case that a comparison between the actual frame start time and a desired frame start time is made on the terminal side, the command unit 502 of the synchronization detection device 500 may further be configured to notify the terminal detection device of a time source serving as a reference. In a case that the terminal detection device calculates and reports a difference between the actual frame start time of the target cell and a desired frame start time based on the reference time, the receiving unit 501 of the synchronization detection device 500 may be configured to receive the difference between the actual frame start time of the target cell and the desired frame start time based on the time source as well as the cell ID and the operator ID of the corresponding target cell, reported by the terminal side, by detecting RRC connection request signaling or other RRC signaling (such as measurement result signaling).

Figure 6:
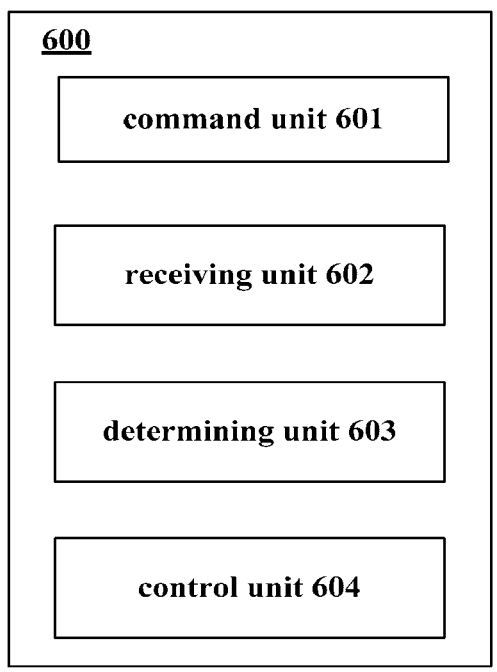
FIG. 6 is a block diagram exemplifying a functional structure of an electronic device for performing synchronization detection on a network side according to an embodiment of the present disclosure.

FIG. 6 is a block diagram exemplifying a functional structure of a synchronization detection device 600 on a network side according to an embodiment of the present disclosure. The synchronization detection device 600 includes a command unit 601, a receiving unit 602, a determining unit 603 and a control unit 604. Structures and functions of the command unit 601 and the receiving unit 602 are the same as structures and functions of the command unit 501 and the receiving unit 502 described with reference to FIG. 5, the repeated description of which is omitted here.

The determining unit 603 may be configured to determine, based on content received by the receiving unit 602, whether the target cell is out of step. For example, the determining unit 603 may determine that the corresponding target cell is well synchronized based on a detection result that the actual time slot allocation of the target is consistent with the target time slot allocation, which is received by the receiving unit 602. For example, in a case that only the actual time slot allocation of the target cell is received by the receiving unit 602, the determining unit 603 may compare an actual time slot allocation with a known target time slot allocation and determines whether an out-of-step occurs based on the comparison result. For example, in a case that the receiving unit 602 receives a result that the difference between the actual frame start time of the target cell and the desired frame start time is greater than the predetermined threshold, the determining unit 603 may determine that the corresponding target cell is out of step based on the result. For example, in a case that the differences between the actual frame start times of all the target cells and the desired frame start time are received by the receiving unit 602, the determining unit 603 may compare all the obtained differences with the predetermined threshold to determine whether an out-of-step occurs.

In response to a determination that an out-of-step occurs, the control unit 604 may take control measures correspondingly, such as notifying a network administrator.

In some embodiments, the synchronization detection device 600 is implemented as a base station, and the target cell on which synchronization detection is performed by the terminal detection device also includes a cell of the synchronization detection device 600. In this scenario, the control unit 604 of the synchronization detection device 600 may be configured to: perform control to readjust time synchronization of itself when it is determined that the cell itself is out of step; perform control to notify the designated party such as the network administrator when it is determined that a cell other than itself is out of step.

To avoid possible inaccuracy of measurement due to transmission delay, a distance, from either the dedicated terminal detection device or the regular user equipment capable of synchronization detection such as a cell phone to the base station of the detected target cell, at the time of performing the synchronization detection of frame start time should be less than a predetermined distance. For example, in a case that a synchronization indicator between base stations requires that a difference of start time of radio frame is less than or equal to 3 micrometers ($3*10^{-6}$ m), the predetermined distance may be calculated as: $3*10^8$ (light velocity)$*3*10^{-6}$(synchronization indicator)$*10^{-1}$(measurement error tolerance)=90 m.

That is, in the procedure of network deployment, the dedicated terminal detection device should be arranged at a distance less than 90 m from the base station of the target cell.

If the terminal detection device is implemented as a regular user equipment, the command unit of the synchronization detection device 500 (or a synchronization detection device 600) on the network side which is, for example, implemented as a base station, may be configured to measure or estimate a distance from a candidate terminal device to the base station of the present cell based on an advanced amount of uplink transmission time of the candidate terminal device and a path loss of the cell. In some cases, in a same geographical area, base stations of different operators are arranged at a same tower or arranged closely. In such cases, the calculated or estimated distance from the cell phone to a serving base station is regarded as a distance from the cell phone to a base station of each target cell, thereby determining a terminal device to be configured for performing synchronization detection. In a case that base stations of different operators are not arranged closely, the present cell may obtain a position of the base station of the target cell based on pre-stored network deployment information, the cell may further screen and obtain a terminal device at a distance from the target cell less than the predetermined distance based on signal arrival angle information or GPS location information of the candidate terminal device. Then, the command unit may select and activate the candidate terminal device at a distance less than or equal to the predetermined distance threshold such as 90 m as the terminal detection device to perform the synchronization detection on the target cell.

Figure 7:
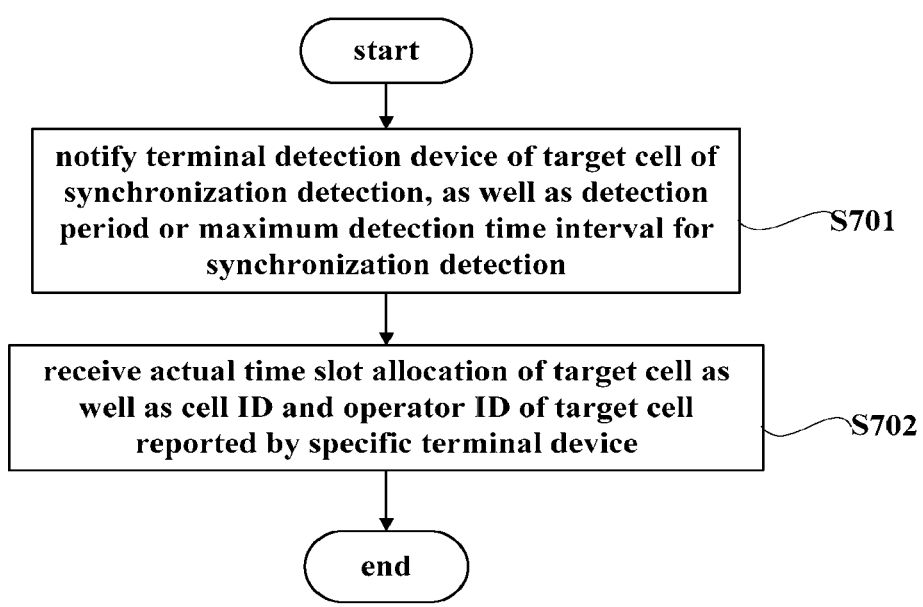
FIG. 7 is a flowchart exemplifying a method for detecting synchronization between cells in TDD communication systems according to an embodiment of the present disclosure.

FIG. 7 is a flowchart exemplifying a method for detecting synchronization between cells in a TDD communication system according to an embodiment of the present disclosure. In step S701, a terminal detection device is notified of a target cell serving as a target cell of synchronization detection, as well as a detection period or a maximum detection time interval of the synchronization detection. In step S702, an actual time slot allocation of the target cell as well as a cell ID and an operator ID of the target cell reported by the specific terminal device are received. The method will not be described in detail since the method has been specifically explained with reference to FIG. 5 and FIG. 6 in the above.

Figure 8:
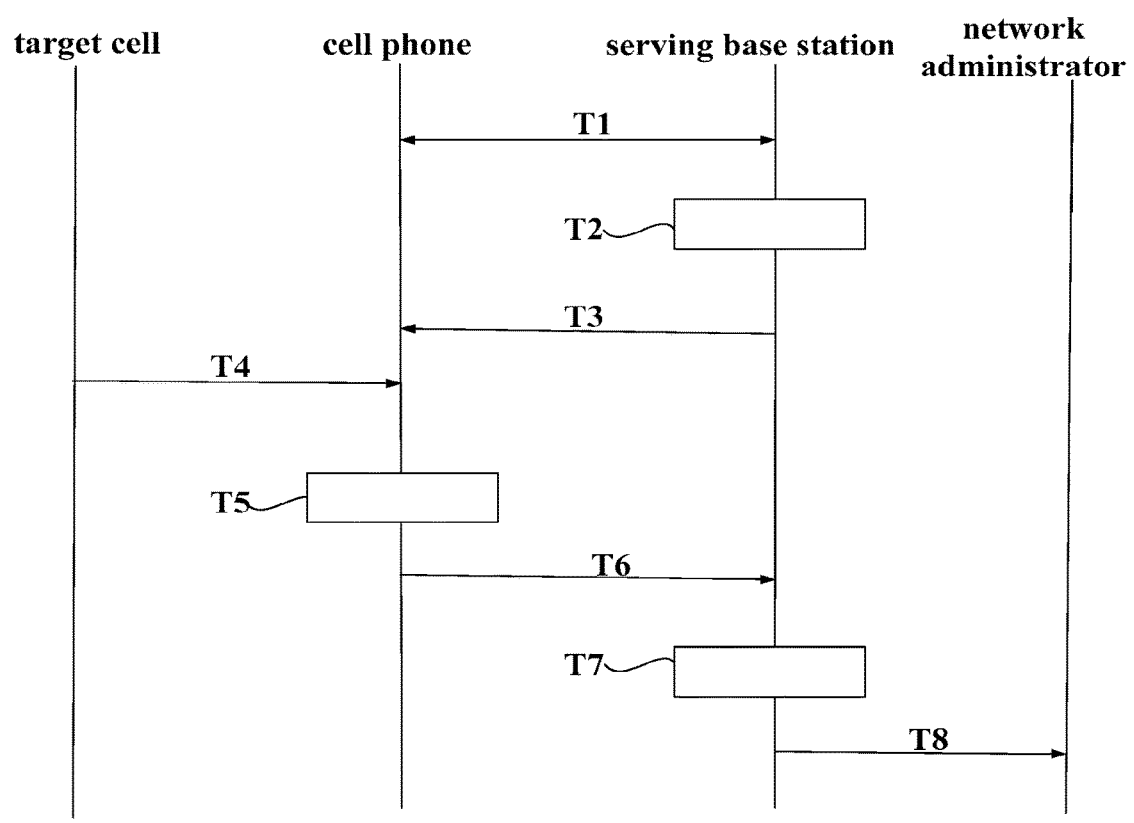
FIG. 8 is a timing diagram exemplifying a specific embodiment of performing TDD synchronization detection by using the synchronization detection technology according to an embodiment of the present disclosure.

Next, a specific embodiment is described with reference to FIG. 8. FIG. 8 is a timing diagram exemplifying a specific embodiment of performing TDD synchronization detection by using synchronization detection technology according to an embodiment of the present disclosure.

The "cell phone" is an instance of a regular user terminal having an additional synchronization detection capability. The "serving base station" refers to a base station of a cell serving the cell phone, which is an instance of the network side synchronization detection device coordinating with the terminal detection device in the embodiment in FIG. 8. The "target cell" is an instance of the cell serving as a the synchronization detection target, which certainly may include and represent a current serving base station of a cell phone accepting synchronization detection in FIG. 8. The "network administrator" is an instance of the designated party and the third party.

At time T1, the serving base station performs regular communication with the cell phone.

At time T2, the serving base station calculates a distance from the cell phone to the serving base station based on the an advanced amount of uplink transmission time or a path loss, or estimates a position of the cell phone based on an arrival angle of a cell phone signal. The calculated or estimated distance from the cell phone to the serving base station may be regarded as a distance from the cell phone to the base station of each target cell since in a same geographical area, base stations of different operators are generally arranged at a same tower or arranged closely.

At time T3, a cell phone is selected and a synchronization detection function of the cell phone is activated in a case that the serving base station determines that the distance from the cell phone to the target cell is less than the predetermined threshold. Specifically, content such as the target cell, a target time slot allocation, a reference time source, a synchronization detection interval, a synchronization detection result reporting parameter may be allocated to the cell phone, and synchronization detection is started to be performed by the cell phone.

At time T4, the cell phone monitors system information and/or a downlink synchronization signal of the target cell (the target cell may be the serving base station) during a synchronization detection interval, so as to obtain an actual time slot allocation and/or an actual frame start time of the target cell.

At time T5, the cell phone may compare the target time slot allocation with the actual time slot allocation, and compare the actual frame start time with the desired frame start time to determine whether an out-of-step occurs. Of course, instead of being performed on the cell phone side, the comparison of the information may also be performed in the serving base station.

At time T6, the cell phone determines the result, or only transmits information obtained from the target cell to the serving base station.

At time T7, the serving base station determines a condition of out-of-step based on content reported by the cell phone. Moreover, the serving base station may adjust its own time synchronization in a case that the serving base station itself is out of step.

At time T8, the base station may report the synchronization detection result to the network administrator so as to coordinate between the different operators by the network administrator.

In the embodiment as shown in FIG. 8, the cell phone and the base station are taken as instances of the electronic device according to the present disclosure. Alternatively, the electronic device according to the present disclosure may also be implemented as an integrated circuit chip which can be embedded in the cell phone, the dedicated device or the base station. For example, the electronic device according to the present disclosure may include a micro-processor, such as a DSP (digital signal processor), integrated with the above detection function or configuration function.

The synchronization detection technology according to embodiments of the present disclosure is applicable to a time division duplex (TDD) network, such as a TD-LTE network, and a TD-SCDMA network.

The present disclosure is described by referring to flowcharts and/or block diagrams of the method and the device according to embodiments of the present disclosure in the above. It should be noted that, for the purpose of clarity, indication and description of components and processing irrelevant to the present disclosure and known by those skilled in the art are omitted in the drawings and the explanation. Each block of the flowchart and/or the block diagram and combinations of blocks in the flowcharts and/or block diagrams can be implemented with computer program instructions. These computer program instructions may be provided to a processor of a general purpose computer, a special purpose computer or other programmable data processing apparatus, thereby producing such machine that, by executing the instructions by the computer or the other programmable data processing apparatus, an apparatus for achieving functions/operations specified in the flowchart/blocks of block diagrams is generated.

These computer program instructions may also be stored in a computer-readable medium which can command a computer or other programmable data processing apparatus to operate in a particular manner, so that the instructions stored in the computer-readable medium generate manufactured articles including instruction means for implementing functions/operations specified in blocks of the flowcharts and/or block diagrams.

The computer program instructions may also be loaded onto a computer or other programmable data processing apparatus, so that a series of operational steps are executed on the computer or other programmable data processing apparatus so as to produce a process implemented by the computer, thereby instructions executed on the computer or other programmable apparatus provide a process of implementing functions/operations specified in blocks in the flowcharts and/or block diagrams.

It should be appreciated that, the flowcharts and block diagrams in the drawings illustrate architectures, functions and operations which may be implemented by the system the method and computer program product according to various embodiments of the present disclosure. In this regard, each block in the flowcharts or the block diagrams may represent a module, a program segment or a part of the code, the module, the program segment or the part of the code contains one or more executable instructions for implementing the specified logic functions. It should also be noted that, in some alternative implementations, the functions noted in the blocks may also be implemented in an order different from that illustrated in the drawings. For example, two consecutive blocks may be actually executed substantially in parallel, or they may also be performed in a reverse order, depending on the involved functionality. It should also be noted that, each block in the block diagrams and/or flowchart block as well as combinations of the blocks in the block diagrams and/or the flowcharts, may be implemented by a dedicated system based on hardware for executing specified functions or operations, or may be implemented by combinations of a dedicated hardware and computer instructions.

Figure 9:
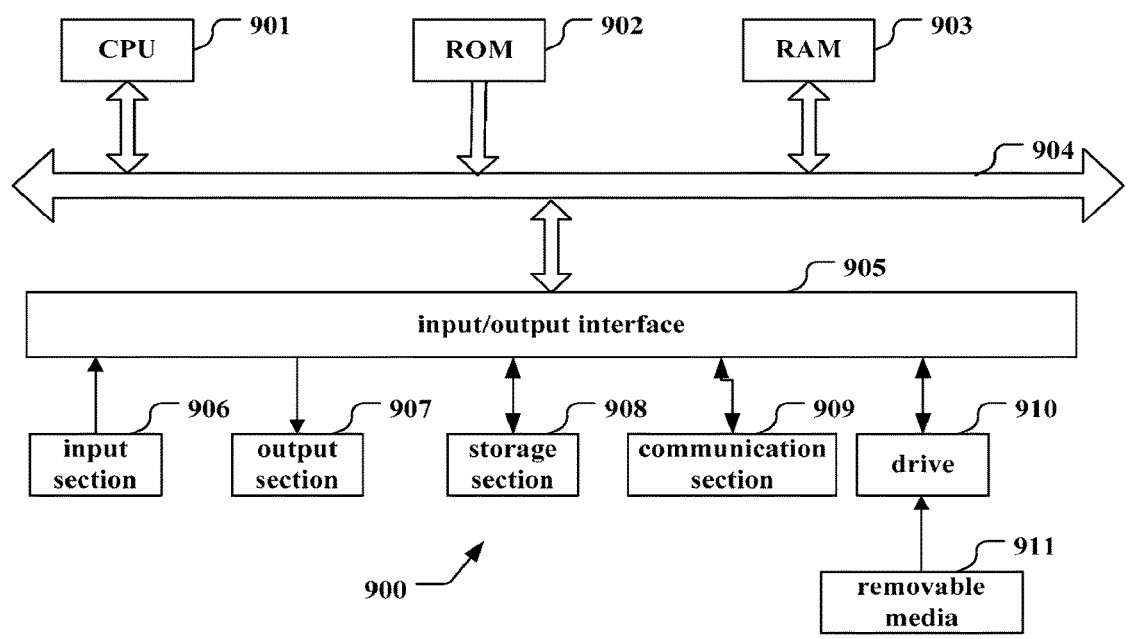
FIG. 9 is a block diagram of an exemplary structure of a computer capable of implementing the present disclosure.

FIG. 9 is a block diagram of an exemplary structure of a computer capable of implementing the present disclosure. In FIG. 9, a central processing unit (CPU) 901 performs various processing according to the program stored in a read only memory (ROM) 902 or the program loaded from the storage section 908 to a random access memory (RAM) 903. In the RAM 903, the data required by CPU 901 to execute various processing is also stored as necessary.

CPU 901, ROM 902 and RAM 903 are connected to each other via a bus 904. Input/output interface 905 is also connected to the bus 904.

The following components are connected to the input/output interface 905: an input section 906, including a keyboard, a mouse, etc.; an output section 907, including a display, such as a cathode ray tube (CRT), a liquid crystal display (LCD), etc., and a speaker, etc.; a storage section 908 including a hard disk, etc.; and a communication section

909, including a network interface card such as a LAN card, a modem, etc. The communication section 909 performs a communication process via a network, such as the Internet.

A drive 910 may also be connected to the input/output interface 905 as needed. A removable medium 911 such as a magnetic disk, an optical disk, a magneto-optical disk, or a semiconductor memory, is mounted on the drive 910 as needed, such that a computer program read out therefrom is installed into the storage section 908 as needed.

In the case of implementing the above-described series of processing by software, the program constituting the software is installed via the network such as the Internet or a storage medium such as the removable media 911.

It should be appreciated by those skilled in the art that, such storage medium is not limited to the removable media 911 shown in FIG. 9 in which the program is stored and distributed separately from the apparatus to provide program to the user. The examples of the removable media 911 include a magnetic disk, an optical disk (including compact disc read-only memory (CD-ROM) and a digital versatile disk (DVD)), a magneto-optical disk (including a mini disc (MD)) and a semiconductor memory. Alternatively, the storage medium may be a ROM 902, a hard disk contained in the storage section 908 and so on, in which the program is stored, and is distributed to users together with the apparatus containing them.

It should be understood that, the terminology used herein is only for purpose of describing particular embodiments but not intended to limit the present disclosure. As used herein, "a" and "the" in a singular form are intended to include the plural forms unless the context clearly indicates otherwise. Also, "contain" used in this specification specifies the presence of the stated features, entireties, steps, operations, elements, and/or components, but do not preclude the presence or addition of one or more other features, entireties, steps, operations, elements and/or components, and/or a combination thereof.

The present disclosure is described by referring to particular embodiments in the foregoing specification. However, those skilled in the art understand that various modifications and changes can be made without departing from the scope of the present disclosure as defined in the claims.

The technology according to the present disclosure may further be implemented by the following embodiment.

1. An electronic device capable of accessing a communication channel of a time division duplex wireless communication system, including:

an acquiring unit configured to acquire, at a specific time, an actual time slot allocation of a target cell, as well as a cell ID and an operator ID of the target cell; and a reporting unit configured to transmit the actual time slot allocation of the target cell as well as the cell ID and the operator ID of the target cell to a designated party.

2. The electronic device according to embodiment 1, wherein the acquiring unit is configured to acquire a target time slot allocation of the target cell;

the electronic device further includes a comparing unit configured to compare the actual time slot allocation of the target cell with the target time slot allocation; and the reporting unit is configured to transmit at least the actual time slot allocation inconsistent with the target time slot allocation as well as the cell ID and the operator ID of the corresponding target cell to the designated party.

3. The electronic device according to embodiment 1 or 2, wherein the acquiring unit is configured to acquire, at the specific time, an actual frame start time of the target cell; and the reporting unit is configured to transmit the actual frame start time of the target cell as well as the cell ID and the operator ID of the target cell to the designated party.

4. The electronic device according to embodiment 2, wherein the acquiring unit is configured to acquire the actual frame start time of the target cell, and acquire a reference time as a time reference;

the comparing unit is further configured to calculate a difference between the actual frame start time of the target cell and a desired frame start time based on the reference time; and the reporting unit is configured to transmit at least the difference having an absolute value greater than a predetermined threshold, as well as the cell ID and the operator ID of the corresponding target cell, to the designated party.

5. The electronic device according to embodiment 3 or 4, wherein the acquiring unit is configured to acquire the actual time slot allocation and the actual frame start time by monitoring system information and a downlink synchronization signal of the target cell respectively.

6. The electronic device according to any one of embodiments 1 to 5, wherein the reporting unit is capable of reporting by using radio resource control connection request signaling.

7. The electronic device according to any one of embodiments 1 to 6, wherein the acquiring unit is configured to receive a designation of the target cell.

8. The electronic device according to any one of embodiments 1 to 7, wherein the electronic device is a dedicated synchronization detection device, which adaptively selects the specific time based on a configured maximum detection time interval.

9. The electronic device according to any one of embodiments 1 to 7, wherein the electronic device is a user equipment capable of performing wireless communication which is configured to perform detection within a specific synchronization interval.

10. The electronic device according to embodiment 9, wherein the reporting unit is further capable of reporting by using radio resource control signaling other than the radio resource control connection request signaling.

11. An electronic device for a time division duplex wireless communication system, wherein the electronic device includes:

a command unit configured to notify a specific terminal device of a target cell serving as a target of synchronization detection, as well as a detection period or a maximum detection time interval for the synchronization detection; and a receiving unit configured to receive an actual time slot allocation of the target cell as well as a cell ID and an operator ID of the target cell reported by the specific terminal device.

12. The electronic device according to embodiment 11, wherein the command unit is further configured to notify the specific terminal device of a target time slot allocation of the target cell.

13. The electronic device according to embodiment 11 or 12, wherein the receiving unit is configured to receive an actual frame start time of the target cell as well as the cell ID and the operator ID of the target cell reported by the specific terminal device.

14. The electronic device according to embodiment 11 or 12, wherein the command unit is further configured to notify the specific terminal device of a time source serving as a reference; and the receiving unit is configured to receive a difference between the actual frame start time of the target cell and a desired frame start time based on a time of the time source, as well as the cell ID and the operator ID of the target cell reported by the specific terminal device.

15. The electronic device according to any one of embodiments 11 to 14, wherein the receiving unit is configured to perform the reception by detecting radio resource control connection request signaling or measurement result signaling.

16. The electronic device according to any one of embodiments 11 to 15, wherein the electronic device is a base station, and the target cell includes a cell of the base station, where the base station further includes:

a determining unit configured to determine, based on content received by the receiving unit, whether or not the target cell is out of step; and a control unit configured to perform control to readjust time synchronization of itself when it is determined that itself is out of step, and perform control to send a notification to a designated party when it is determined that a cell other than itself is out of step.

17. The electronic device according to embodiment 16, wherein the command unit is further configured to measure or estimate a distance from a candidate terminal device to a base station of the target cell based on an advanced amount of an uplink transmission time of the candidate terminal device, a path loss of the present cell or a signal arrival angle of the candidate terminal device, and to select and activate a candidate terminal device at a distance from the base station of the target cell less than or equal to a predetermined distance threshold as the specific terminal device for performing the synchronization detection on the target cell.

18 The electronic device according to any one of embodiments 11 to 17, wherein the command unit is further configured to activate the detection of the specific terminal device in response to detecting that interference exceeds a predetermined threshold.

19. A method of detecting synchronization between cells in a time division duplex wireless communication system, including:

Acquiring, at a specific time, an actual time slot allocation of a target cell, as well as a cell ID and an operator ID of the target cell; and transmitting the actual time slot allocation of the target cell as well as the cell ID and the operator ID of the target cell to a designated party.

20. A method of detecting synchronization between cells in a time division duplex wireless communication system, including:

notifying a specific terminal device of a target cell serving as a target of synchronization detection, as well as a detection period or a maximum detection time interval of the synchronization detection; and receiving an actual allocation of the target cell as well as a cell ID and an operator ID of the target cell reported by the specific terminal device.

The invention claimed is:

1. An electronic device capable of accessing a communication channel of a time division duplex wireless communication system, comprising:

acquiring circuitry configured to acquire, at a specific time, an actual time slot allocation of a target cell by synchronizing to the target cell based on a detection period or a maximum detection time interval, as well as a cell ID and an operator ID of the target cell, the target cell serving as a target of synchronization detection of the electronic device; and reporting circuitry configured to transmit the actual time slot allocation of the target cell as well as the cell ID and the operator ID of the target cell to a designated party, wherein the electronic device communicates with a base station, and the target cell comprises a cell of the base station, wherein the base station comprises:

determining circuitry configured to determine, based on content received, whether or not the target cell is out of step; and control circuitry configured to perform control to readjust time synchronization of itself when it is determined that itself is out of step, and perform control to send a notification to a designated party when it is determined that a cell other than itself is out of step, wherein command circuitry of the base station is further configured to measure or estimate a distance from a candidate terminal device to the base station of the target cell based on an advanced amount of an uplink transmission time of the electronic terminal device, a path loss of the present cell or a signal arrival angle of the electronic terminal device, and to select and activate the electronic terminal device at a distance from the base station of the target cell less than or equal to a predetermined distance threshold as a specific terminal device for performing the synchronization detection on the target cell.

2. The electronic device according to claim 1, wherein the acquiring circuitry is configured to acquire a target time slot allocation of the target cell;

the electronic device further comprises comparing circuitry which is configured to compare the actual time slot allocation of the target cell with the target time slot allocation; and the reporting circuitry is configured to transmit at least the actual time slot allocation inconsistent with the target time slot allocation as well as the cell ID and the operator ID of the corresponding target cell to the designated party.

3. The electronic device according to claim 1, wherein the acquiring circuitry is configured to acquire an actual frame start time of the target cell at the specific time; and the reporting circuitry is configured to transmit the actual frame start time of the target cell as well as the cell ID and the operator ID of the target cell to the designated party.

4. The electronic device according to claim 2, wherein the acquiring circuitry is configured to acquire the actual frame start time of the target cell, and acquire a reference time as a time reference;

the comparing circuitry is further configured to calculate a difference between the actual frame start time of the target cell and a desired frame start time based on the reference time; and the reporting circuitry is configured to transmit at least the difference having an absolute value greater than a predetermined threshold, as well as the cell ID and the operator ID of the corresponding target cell, to the designated party.

5. The electronic device according to claim 3, wherein the acquiring circuitry is configured to acquire the actual time slot allocation and the actual frame start time by monitoring system information and a downlink synchronization signal of the target cell respectively.

6. The electronic device according to claim 1, wherein the reporting circuitry is capable of reporting by using radio resource control connection request signaling.

7. The electronic device according to claim 1, wherein the acquiring unit is configured to receive a designation of the target cell.

8. The electronic device according to claim 1, wherein the electronic device is a dedicated synchronization detection device, which adaptively selects the specific time based on a configured maximum detection time interval.

9. The electronic device according to claim 1, wherein the electronic device is a user equipment capable of performing wireless communication which is configured to perform detection within a specific synchronization interval.

10. The electronic device according to claim 9, wherein the reporting circuitry is further capable of reporting by using radio resource control signaling other than the radio resource control connection request signaling.

11. An electronic device for a time division duplex wireless communication system, wherein the electronic device comprises:
command circuitry configured to notify a specific terminal device of a target cell serving as a target of synchronization detection, as well as a detection period or a maximum detection time interval for the synchronization detection; and
receiving circuitry configured to receive an actual time slot allocation of the target cell as well as a cell ID and an operator ID of the target cell reported by the specific terminal device,
wherein the electronic device is a base station, and the target cell comprises a cell of the base station,
wherein the base station further comprises:
determining circuitry configured to determine, based on content received by the receiving circuitry, whether or not the target cell is out of step; and
control circuitry configured to perform control to readjust time synchronization of itself when it is determined that itself is out of step, and perform control to send a notification to a designated party when it is determined that a cell other than itself is out of step,
wherein the command circuitry is further configured to measure or estimate a distance from a candidate terminal device to a base station of the target cell based on an advanced amount of an uplink transmission time of the candidate terminal device, a path loss of the present cell or a signal arrival angle of the candidate terminal device, and to select and activate a candidate terminal device at a distance from the base station of the target cell less than or equal to a predetermined distance threshold as the specific terminal device for performing the synchronization detection on the target cell.

12. The electronic device according to claim 11, wherein the command circuitry is further configured to notify the specific terminal device of a target time slot allocation of the target cell.

13. The electronic device according to claim 11, wherein the receiving circuitry is configured to receive an actual frame start time of the target cell as well as the cell ID and the operator ID of the target cell reported by the specific terminal device.

14. The electronic device according to claim 11, wherein the command circuitry is further configured to notify the specific terminal device of a time source serving as a reference;
wherein the receiving circuitry is configured to receive a difference between the actual frame start time of the target cell and a desired frame start time based on a time of the time source, as well as the cell ID and the operator ID of the target cell reported by the specific terminal device.

15. The electronic device according to claim 11, wherein the receiving unit is configured to perform the reception by detecting radio resource control connection request signaling or measurement result signaling.

16. The electronic device according to claim 11, wherein the command circuitry is further configured to activate the detection of the specific terminal device in response to detecting that interference exceeds a predetermined threshold.

17. A method of detecting synchronization between cells in a time division duplex wireless communication system, comprising:
acquiring, at a specific time, an actual time slot allocation of a target cell by synchronizing to the target cell based on a detection period or a maximum detection time interval, as well as a cell ID and an operator ID of the target cell, the target cell serving as a target of synchronization detection of the electronic device;
transmitting the actual time slot allocation of the target cell as well as the cell ID and the operator ID of the target cell to a designated party;
determining, based on content received, whether or not the target cell is out of step;
readjusting time synchronization when it is determined that the target cell is out of step, and sending a notification to a designated party when it is determined that another cell is out of step;
measuring or estimating a distance from a candidate terminal device to a base station of the target cell based on an advanced amount of an uplink transmission time of the candidate terminal device, a path loss of the present cell or a signal arrival angle of the candidate terminal device, and to select and activate a candidate terminal device at a distance from the base station of the target cell less than or equal to a predetermined distance threshold as the specific terminal device for performing the synchronization detection on the target cell.

18. A method of detecting synchronization between cells in a time division duplex wireless communication system, comprising:
notifying a specific terminal device of a target cell serving as a target of synchronization detection, as well as a detection period or a maximum detection time interval of the synchronization detection;
receiving an actual allocation of the target cell as well as a cell ID and an operator ID of the target cell reported by the specific terminal device;
determining, based on content received, whether or not the target cell is out of step;
readjusting time synchronization when it is determined that the target cell is out of step, and sending a notification to a designated party when it is determined that another cell is out of step;

measuring or estimating a distance from a candidate terminal device to a base station of the target cell based on an advanced amount of an uplink transmission time of the candidate terminal device, a path loss of the present cell or a signal arrival angle of the candidate terminal device, and to select and activate a candidate terminal device at a distance from the base station of the target cell less than or equal to a predetermined distance threshold as the specific terminal device for performing the synchronization detection on the target cell.

\* \* \* \* \*